United States Patent [19]

Kasamatsu et al.

[11] 4,179,536
[45] Dec. 18, 1979

[54] ANTICORROSIVE PAINTS FOR OIL CONTAINERS

[76] Inventors: Hiroshi Kasamatsu, 47-7, Higashihon-cho; Koshiro Suzuki, 52-25, Higashihon-cho, both of Otashi, Gunma-ken, Japan

[21] Appl. No.: 442,867

[22] Filed: Feb. 15, 1974

Related U.S. Application Data

[63] Continuation of Ser. No. 253,816, May 16, 1972, abandoned, and a continuation-in-part of Ser. No. 73,683, Sep. 18, 1970, abandoned, and Ser. No. 877,850, Nov. 18, 1969, abandoned.

[51] Int. Cl.$^2$ .................. B05D 1/00; C09D 5/08; C09D 5/14
[52] U.S. Cl. .................. 427/239; 106/15.05; 220/470; 260/45.75 K; 260/45.75 T; 260/45.75 Z; 260/429.7; 424/288; 428/907
[58] Field of Search ............. 260/429.7, 45.75 K, 260/45.75 T, 45.75 Z; 424/288; 106/15 AF; 220/64; 427/239; 428/907

[56] References Cited

U.S. PATENT DOCUMENTS

| | | | |
|---|---|---|---|
| 2,726,227 | 12/1955 | Leistner et al. | 260/429.7 |
| 3,400,201 | 9/1968 | Mocotte | 424/288 |
| 3,446,650 | 5/1969 | Smith | 220/64 |
| 3,795,741 | 3/1974 | Minieri | 260/429.7 |

*Primary Examiner*—Allan Lieberman
*Attorney, Agent, or Firm*—William A. Drucker

[57] ABSTRACT

The present anti-corrosive paint is for use on the inner walls of oil containers to protect said container walls from corrosion caused by micro-organisms.

3 Claims, No Drawings

ANTICORROSIVE PAINTS FOR OIL CONTAINERS

The present application is a continuation-in-part of our applications Ser. No. 877,850, filed Nov. 18, 1969 and Ser. No. 73,683, filed Sept. 18, 1970, and a continuation of application Ser. No. 253,816, filed May 16, 1972, all now abandoned.

The present invention relates to paints to be applied to the inner wall faces of containers for fuels and solvents of petroleum origin, such as gasoline, kerosene, jet plane fuel and the like in order to protect said containers from corrosion caused by micro-organisms.

Petroleum products, in general, contain no microorganism soon after distillation. However, they absorb moisture and are subject to infiltration of various microorganisms floating in the atmosphere during transportation, subdivision treatment and storage. And, such micro-organisms are nourished by two hydrocarbons of petroleum products and inorganic salts contained therein, and multiply rapidly into an astronomical figure at boundry faces of petroleum products and water, causing corrosion of containers containing said petroleum products.

For instance, it was reported (A. V. Churchill, Materials Protection, 2, 19, 1963; L. D. Dushnell, H. F. Haas, J. Bact., 1961, 653), that pure aluminum fuel tanks of jet planes corroded with a fuel named JP-4 which is a mixture of gasoline, kerosene, and water.

Heretofore, it has been known as a countermeasure for corrosion of fuel tanks caused by micro-organisms, to coat the inner faces of such tanks with paints containing chemical agents having anti-fungi properties. However, it has also been disclosed in a test in which aluminum test pieces were coated with paints which are being used currently for aircraft fuel tanks (Pr 122 A 1/2 (Mil-S7502C, PR 1005 L (MIL-S4383) and DV 1180) in which potato dextrose and agar plate culture medium were used, that such paints had little anticorrosive action. A Japanese report (Kagaku To Kogyo, Vol. 20, No. 12, p. 118) concludes that, corrosion of aluminium cannot really be prevented with such anti-fungi paints. With respect to such anti-fungi paints, *Cladosporium resinae* was reported (above-mentioned literature and Japanese magazine, Keikinzoku, Vol. 16, No. 3 (No. 77), 1966, p. 147) to be most harmful. However, aeroplanes, motor cars, tank lorries, storage tanks and home oil heaters are injured by these micro-organisms. These facts are neglected on account of the difficulty of finding their causes. Quick countermeasures against corrosion of such fuel containers should be taken to avoid damage caused by leakage of fuel.

We have made extensive investigations and found means for checking multiplication of micro-organisms within fuel containers so as to prevent damage caused by leakage of fuel containers and secure safety of transportation facilities using petroleum fuel.

Anticorrosive paints for oil containers according to the present invention comprise single or plural kinds of organic compounds of tin represented by general formulas, $(n\text{-}C_4H_9)_3Sn\ X\ R$, or $(n\text{-}C_4H_9)_3Sn\ OCOCH_2XR$, where, R is an alkyl radical having one to five carbon atoms or a substituted compound of benzene having one or a plural number of substituents including at least one chloro radical, nitro radical, alkyl radical having one to five carbon atoms, or alkenyl radical having three carbon atoms, when the number of chloro atoms as the substituent is one to five, the location of the alkyl radical on the benzene nucleus is limited to the fourth position and X is an atom of oxygen or sulphur. And, the aforementioned organic compound of tin are dissolved, mixed or dispersed in a known inactive paint vehicle. The expression "inactive" means chemically inactive to metals which compose walls of fuel tanks. Accordingly, in order to prepare a paint according to the present invention, one or more of the aforementioned organic compound of tin is dissolved in a suitable solvent and the resultant solution is mixed in a paint vehicle, or a suitable surface active agent or emulsifier may be used so as to disperse said organic compound of tin in water and a required paint vehicle.

Of the chemical compounds which may be used as active agents in the present invention and which have the general formulas shown in the foregoing, compounds having a general formula $(n\text{-}C_4H_9)_3SnXR$ can be prepared as follows: RX-Metal, (where: Metal is metallic sodium, metallic potassium, metallic lithium, or metallic magnesium) which is derived from RXH is acted on tri-n-butyltin chloride, or a mixture of tri-n-butyltin oxide and RXH without solvent, or in a suitable solvent such as benzene, toluene or xylene, is dehydrated by heating. Or otherwise, a compound having a general formula $(n\text{-}C_4H_9)_3Sn\ OCOCH_2XR$ which has been described above is dissolved in a solvent such as benzene, ether, toluene, or the like and washed with weak alkaline solution such as sodium bicarbonate or potassium bicarbonate. After washing with alkaline solution, the water layer is removed and the organic solvent layer is gathered. The solvent layer is then dried with drying agents such as sodium carbonate anhydride or potassium carbonate anhydride, and the drying agents are filtered and the solvent layer is gathered. Subsequently, the solvent layer is concentrated in vacuo and the above-mentioned active agent according to the present invention is obtained.

The compounds having a general formula $(n\text{-}C_4H_9)_3SnOCOCH_2XR$ which has been stated in the foregoing may be prepared as follows: The aforementioned RX-Metal is acted on tri-n-butylin monochloroacetate, or otherwise, alkyloxyacetic acid; substituted phenoxyacetic acid, alkenyloxyacetic acid, substituted thiophenolacetic acid, alkylthioacetic acid, or alkenylthioacetic acid which are represented by a general formula $RXCH_2COOH$ and tri-n-buthyltin oxide are dehydrated by heating in a solvent or without solvent.

TRI-N-BUTYLTIN pentachlorophenoxy acetate

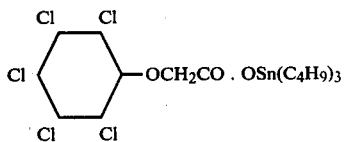

97.4 g. (0.3 mol) of pentachlorophenoxy acetic acid, 8.91 g. (0.15 mol) of di-tri-n-butyltin oxide, and 300 ml of anhydrous toluene were mixed and heated under agitation and in using a reflux condenser. Water produced by the reaction was distilled away together with toluene. From the distillate water was removed and measured, and toluene was recycled. The dehydration reaction was completed satisfactorily and almost all the calculated amount of water could be recovered. Time required for the reaction was from one to two hours.

The resultant product was then filtered, and the filtrate was concentrated in vacuo. Thin reddish brown oil was obtained. This oil solidified when the same was cooled with water. When the oil was recrystallized from n-hexane, 180 g. of colourless crystals in plate form (yield, 98.0%) were obtained.

Analytical values of the product, molecular formula and molecular weight being taken as $C_{20}H_{29}O_3Cl_5Sn$ and 613.4 g. respectively were as follows:

Calculated values; C=39.18%, H=4.77%, Sn=19.35%.

Experimental values: C=39.40%, H=4.81%, Sn=19.27%.

TRI-N-BUTYLTIN-4-NITROPHENOXY ACETATE

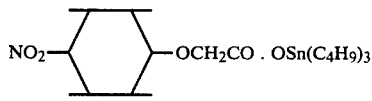

16.5 g. (0.1 mol) of 4-nitrophenoxy acetic acid, 23 g. (0.05 mol) of tri-n-butyltin oxide, and 100 ml of anhydrous toluene were mixed for three hours using a reflux condenser. The solvent was distilled away. A calculated amount of water, together with toluene was distilled out. The residual syrup-like substance, petroleum ether being added therein and cooled with ice was crystallized. The raw crystals were dissolved in benzene, heated and filtered. The filtrate, petroleum ether being added therein was cooled with ice. Then 36 g. of crystals in plate forms having a yellowish brown colour and m.p. 63° C. (yield, 74.0%) were obtained.

Analytical values of the product, molecular formula and molecular weight being taken as $C_{20}H_{33}O_5NSn$ and 485.7 g. respectively were as follows:

Calculated values: C=49.42%, H=6.84%, Sn=24.43%.

Experimental values: C=49.31%, H=7.03%, Sn=24.38%.

TRI-N-BUTYLTIN-4-T-BUTYLPHENYLTHIO ACETATE

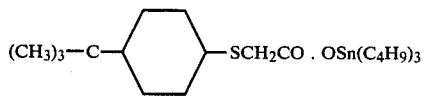

A mixture of 11.5 g. (0.05 mol) of 4-t-butylphenylthio acetic acid, 11.2 g. (0.025 mol) of di-tri-n-butyltin oxide, and 50 ml of anhydrous toluene was heated for about two hours and a half using a reflux condenser and the solvent was removed in vacuo. Water from the reaction was distilled out with the solvent. The residual yellowish red syrup-like substance, a small amount of n-hexane being added therein, was cooled with ice, and crystals were educed. When the crystals were recovered by filtration and recrystallized, 12.9 g. of colourless crystals in plate form of m.p. 62° C. were obtained. The yield was 50.0%.

Analytical values of the product, molecular formula and molecular weight being taken as $C_{24}H_{42}O_2S\ Sn$ and 512.7 g. respectively were as follows:

Calculated values: C=56.19%. H=8.25%.

Experimental values: C=56.38%, H=7.98%.

TRI-N-BUTYLTIN-METOXY ACETATE

$CH_3OCH_2CO.OSn\ (C_4H_9)_3$

A solution containing 59.4 g. (0.1 mol) of di-tri-n-butyltin oxide dissolved in 50 ml of anhydrous benzene was dripped in 18.0 g. (0.2 mol) of metoxy acetic acid. The resultant solution generated heat and had a temperature of about 65° C. The reactor was heated for one hour on a water bath using a reflux condenser. Water together with benzene was removed out of the reaction area, and benzene was recycled. Almost all the calculated amount of water was gathered. Benzene was separated from the water. Thus, a yellowish brown syrup was obtained. The syrup was dissolved in n-hexane and heated to filter. The filtrate was cooled with ice. 72 g. (yield, 95.2%) of colourless crystals in plate form having m.p. 48° C. were obtained.

Analytical values of the product, molecular formula and molecular weight being taken as $C_{15}H_{32}O_3Sn$ and 379.1 g. respectively were as follows:

Calculated values: C=47.53%, H=8.51%, Sn=31.93%.

Experimental values: C=47.90%, H=8.42%, Sn=32.10%.

TRI-N-BUTYLTIN-T-BUTOXY ACETATE

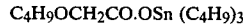

$C_4H_9OCH_2CO.OSn\ (C_4H_9)_3$

A solution of 26.4 g. (0.2 mol) of n-butoxy acetic acid dissolved in 50 ml of anhydrous benzene, being shaken frequently was dripped in 59.4 g. (0.1mol) of di-tri-n-butyltin oxide. The temperature of the solution rose slowly to about 65° C. The solution was then heated for two hours on a water bath using a reflux condenser. Subsequently, upon removal of benzene by distillation under atmospheric pressure, the temperature was increased slowly by making temperature of the bath rise up to 130° C. The amount of water which was distilled out during this heating operation amounted to about 91% of the theoretical value. Then, the resultant solution was distilled in vacuo. 78.0 g. of colourless oil having b.p. 120–128° C. at 50 mm Hg was obtained. The yield was 92.7%.

Analytical values of the product, molecular formula and molecular weight being taken as $C_{18}H_{38}O_3Sn$ and 420.7 g. respectively were as follows:

Calculated values: C=51.35%, H=9.10%, Sn=28.21%.

Experimental values: C=51.43%, H=8.93%, Sn=27.89%.

TRI-N-BUTYLTIN-N-PROPOXY ACETATE

$C_3H_7OCH_2CO.OSn(C_4H_9)_3$

A solution of 59.4 g. (0.1mol) of di-tri-n-butyltin oxide dissolved in 80 ml of benzene was dripped in 23.6 g. (0.2mol) of n-propoxy acetic acid. Upon being shaken well, the solution reacted suddenly in generating heat and the temperature thereof rose to about 70° C. It was then heated on a water bath using a reflux condenser to remove water from the reaction. The calculated amount of water was distilled away. The residue was dissolved in n-hexane and heated to filter. The filtrate was cooled with ice to obtain 79 g. of colourless crystals having m.p. 49°–52° C. The yield was 97.1%.

Analytical values of the product, molecular formula and molecular weight being taken as $C_{17}H_{36}O_3Sn$ and 406.7 g. respectively were as follows:

Calculated values: C=50.16%, H=8.92%, Sn=29.18%.

Experimental values: C=50.32%, H=8.68%, Sn=29.28%.

TRI-N-BUTYLTIN-ETHYLTHIO ACETATE

$C_2H_5.S.CH_2CO.OSn (C_4H_9)_3$ 20 g. (1/6 mol) of ethylthio acetic acid was dissolved in 50 ml of benzene. The solution was dripped in a reactor containing 49.5 g. (1/12 mol) of di-tri-n-butyltin oxide. The reactor was shaken frequently during the dripping operation. The solution generated heat and dehydration reaction occurred. After the dripping operation, the solution was heated for about two hours on a water bath using a reflux condenser for distillation of benzene to remove the same from the solution. Upon removal of benzene, the residual solution was heated for about an hour. The remaining yellowish brown syrup-like substance was cooled with water. Then crystals were educed. The crystals were recrystallized from petroleum ether. Then, 41.0 g. of colourless crystals having m.p. 64° C. were obtained. The yield was 55.4%.

Analytical values of the product, molecular formula and molecular weight being taken as $C_{16}H_{34}O_2Sn$ and 376.7 g. respectively were as follows:

Calculated value: Sn=31.51%.
Experimental value: Sn=31.39%.

TRI-N-BUTYLTIN-PENTACHLOROPHENOL ETHER

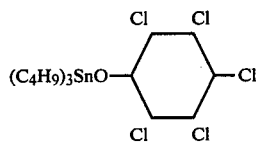

297.4 g. (0.5 mol) of di-tri-n-butyltin, 266.4 g. (1.0 mol) of pentachlorophenol, and 500 ml of anhydrous toluene were mixed. However some amount of heat was observed to generate, the reaction temperature was below 50° C. The solution was heated for three hours using a reflux condenser to remove water from the reaction. The rate of dehydration (experimental and calculated values of dehydration was 8.2 g. and 9.0 g. respectively) showed 91.2%. The resultant solution was washed once with 250 ml of 5% sodium bicarbonate aqueous solution, then three times, each with 250 ml of water to obtain a toluene layer. This layer was dried with Glauber'salt and filtered. The filtrate was concentrated in vacuo (40 mm Hg) and at a bath temperature of 130° C. Then, 540.5 g. of yellowish brown syrup was obtained. The index of refraction of the syrup showed ND 20=1.5590, b.p. 173°–175° C./3 mm Hg.

Analytical values of the product, the molecular formula and molecular weight being taken as $(C_4H_9)_3Sn O.C_6Cl_5$ and 555.38 g. respectively were as follows:

Calculated value: Sn=21.37%.
Experimental value: Sn=21.15%.

TRI-N-BUTYLTIN-4-NITROPHENOL ETHER

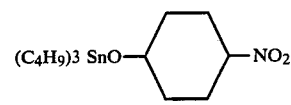

5.8 g. of caustic potassium was dissolved in 300 ml of methyl alcohol under heating. And, 13.9 g. (0.1 mol) of paranitrophenol was added therein under agitation. Then, a solution of red colour was obtained. Subsequently, a solution of 32.5 g. (0.1 mol) of tri-n-butyltin chloride dissolved in 100 ml of methyl alcohol was dripped in said red solution under cooling with water and agitation. After the dripping operation, the agitation was continued for an hour. Then, it was heated mildly to reflux the solvent. After four hours, the resultant solution was concentrated in vacuo. The residue was extracted three times each with 100 ml of benzene. The whole layer of benzene was washed with 10% solution of table salt and recovered by separation, then was dried with Glauber's salt. Subsequently, the filtrate of benzene was refined by passing through a cylindrical glass tube filled with 500 g. of 300 mesh alumina. Anhyrous benzene was used for the developer. The developed solution was concentrated, and then dried in silica gel drier in vacuo to obtain a yellowish orange syrup-like liquid.

Analytical values of the product, molecular formula and molecular weight being taken as $C_{18}H_{31}O_3NSn$ and 414.1 g. respectively were as follows:

Calculated value: Sn=28.66%.
Experimental value: Sn=33.92%.

TRI-N-BUTYLTIN-METHYL ETHER

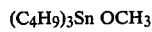
$(C_4H_9)_3Sn\ OCH_3$ 2.3 g. (0.1 mol) of metal sodium was added slowly, under agitation and cooling, in 300 ml of anhydrous methyl alcohol to dissolve sodium therein. In this solution was dripped slowly a solution of 32.5 g. (0.1 mol) of butyltin chloride dissolved in 100 ml of methylalcohol under agitation and cooling. After the dripping operation was continued with agitation for about an hour, the solution was then moderately heated in a water bath as the reflux was effected slightly. After about four hours this was allowed to cool naturally and was filtered. The filtrate was concentrated and distilled 21.8 g. of oil having yellowish green fluorescence and b.p. 140°–143° C./1 mm Hg. The yield was 68.0%.

Analytical values of the product, the molecular formula and molecular weight being taken as $C_{13}H_{30}OSn$ and 321.07 g. respectively were as follows:

Calculated value: Sn=36.97%.
Experimental value: Sn=37.83%.

TRI-N-BUTYLTIN-T-BUTYL ETHER

$(C_4H_9)_3SnO.C(CH_3)_3$ 2.3 g. (0.1 mol) of metal sodium was added, under agitation and cooling in 300 ml of anhydrous t-butyl alcohol and, if necessary, was heated slightly to dissolve sodium therein. Into this solution was dripped a solution of 32.5 g. (0.1 mol) of tri-n-butyltin chloride dissolved in 100 ml of t-butyl alcohol. Immediately after the dripping operation this was heated in using a reflux condenser. After about five hours, the resultant solution was concentrated in vacuo. Upon concentration at a volumetric rate of 1/5 being attained, 200 ml of water was added therein and this was extracted with 200 ml of benzene. Then the benzene layer was removed and the residue was distilled in vacuo to obtain 26.1 g. of colourless syrup-like oil having b.p. 140°–145° C./2 mm Hg. The yield was 72.0%.

Analytical values of the product, the molecular formula and molecular weight being taken as $C_{16}H_{36}OSn$ and 363.14 g. respectively were as follows:
Calculated value: Sn=32.68%.
Experimental value: Sn=32.73%.

TRI-N-BUTYLTIN-ISO-PROPYL ETHER

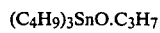
$(C_4H_9)_3SnO.C_3H_7$ 2.3 g. (0.1 mol) of metal sodium was added slowly into 300 ml of anhydrous n-propyl alcohol under agitation and cooling to dissolve sodium therein. Into this was dripped slowly a solution of 32.5 g. (0.1 mol) of tri-n-butyltin chloride dissolved in 100 ml of n-propyl alcohol under the same condition as mentioned above. After the dripping operation, it was stirred for about an hour and then heated for three hours on a water bath using a reflux condenser. It was then cooled and filtered to recover filtrate. The filtrate was concentrated and distilled in vacuo to obtain 25.2 g. of colorless oil having b.p. 120°–125° C. at 0.5 mm Hg. The yield was 72.0%.

Analytical values of the product, the molecular formula and molecular weight being taken as $C_{15}H_{34}OSn$ and 349.122 g. respectively were as follows:
Calculated value: Sn=34.0%.
Experimental value: Sn=33.92%.

TRI-N-BUTYLTIN-ETHYLTHIO ETHER

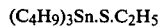
$(C_4H_9)_3Sn.S.C_2H_5$ 0.1 mol (4.8 g. of 50% dispersion in paraffin oil) of sodium hydride was suspended in 300 ml of anhydrous toluene. And a solution of 6.2 g. (0.1 mol) of ethyl mercaptan dissolved in 100 ml of anhydrous toluene under agitation was dripped in the suspension mentioned above. The resultant liquid discharged hydrogen gas intensely to produce the sodium salt of ethyl mercaptan. After the dripping operation, the reaction product was agitated for a while and heated for about two hours on an oil bath under agitation using a reflux condenser. After cooling there was added slowly therein a solution of about 2 ml of anhydrous ethyl alcohol dissolved in 50 ml of toluene to decompose sodium hydride which had not been subjected to the reaction. Then into this was dripped a solution of 32.5 g. (0.1 mol) of tri-n-butyltin chloride dissolved in 100 ml of anhydrous toluene under agitation. After the dripping operation this was heated for four hours on an oil bath under agitation using a reflux condenser. After being left for cooling, the reaction product was mixed with 100 ml of ice water to dissolve salt from the reaction. The organic solvent layer was then recovered, dried with Glauber's salt and filtered. The filtrate was concentrated and distilled to obtain 22.0 g. of colourless oil having b. p. 160°–167° C. at 9 mm Hg. The yield was 63.0%.

Analytical values of the product, molecular formula and molecular weight being taken as $C_{14}H_{32}C Sn$ and 350.7 g. respectively were as follows:
Calculated value: Sn=33.84%.
Experimental value: Sn=33.58%.

TRI-N-BUTYLTIN-4-T-BUTYLTHIO ETHER

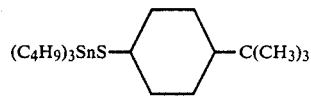

33.2 g. (0.2 mol) of 4-t-n-butyltin phenol, 59.5g. (0.1mol) of di-tri-n-butyltin oxide, and 300 ml of anhydrous toluene were mixed and heated using a reflux condenser. Removal of water produced by the reaction during the heating operation was required. Then the resultant solution was left for natural cooling and then it was washed once with 200 ml of 5% sodium bicarbonate aqueous solution and twice each with 200 ml of water. The toluene layer was then removed by separation and the residue was gathered to be dried with Glauber'salt. The dried substance was then filtered. The filtrate was concentrated and distilled in vacuo to obtain 80.1 g. of a yellow syrup-like oil. The yield was 88.0%.

Analytical values of the product, the molecular formula and molecular weight being taken as $C_{22}H_{40}SSn$ and 455.30 g. respectively were as follows:
Calculated value: Sn=26.07%.
Experimental value: Sn=26.53%, The active agents in anti-fungi paints heretofore used are pentachlorophenol tri-n-butyltin oxide, tri-n-butyltin acetate, and mercury. These agents lack prolonged activity, that is, their activity continues only a short period of time. Moreover, they are ionized and cause electrolytic corrosion, resulting in destruction of metallic materials of containers. In consequence, they are often deemed to be more harmful than they are useful.

Principal and important properties which an agent for checking growth and extinction of mirco-organisms should have would be as follows:

(1) It must have an excellent checking power or extinctive action on unfavorable micro-organisms even in a small concentration.

(2) It must be chemically stable and give little influence on petroleum products.

(3) It must cause no electrolytic corrosion in materials composing containers for fuel.

(4) Its usefulness must continue for a long period of time.

We have found that chemical compounds represented by general formulas, (n—$C_4H_9$)SnXR and (n—$C_4H_9$)3 $SnOCOCH_2XR$ which have been stated above satisfy the aforementioned requirements, and as seen from the annexed tables showing the records of our experiments, their enduring properties are much greater than the agents heretofore used for the aforementioned object.

In Table 1 are shown records of experiments on antibiotic action of organic tin compounds used in the paints according to the present invention on various fungi. As seen from the table, these compounds in small concentration of 1 to 7 ppm may render micro-organisms, which in a comparatively large amount exist in petroleum fuel, rapidly extinct. In this experiment tested compounds which were dissolved in methyl alcohol were mixed at the rates as indicated in the table in bacto dextrose agar plate culture media. Mixed fungi of A, B, C, D, and E, which will be indicated on a separate sheet, were sprayed on the aforementioned culture media and cultured with a thermostat for 72 hours and at a temperature 37° C. The indicated figures are the concentration rates of compounds with which growth of fungi was checked. During the culture, distilled and sterlized water was added in a germfree operation for preventing hardening of the culture media.

With respect to the above-indicated marks, A is *Cladosporium resinae*, B is *Aspergillus niger*, C is *Aspergillus flavus*, D is *Cheatomium glabosum* and E is *Penicillium citrinum*.

Table 2
Antibiotic Action of Known Anti-Fungi Agents

| Anti-Fungi Agents | Fungi; Concentration (ppm) | | | | |
|---|---|---|---|---|---|
| | A | B | C | D | E |
| Pentachlorophenol | 10 | 30 | 50 | 20 | 20 |
| Tri-n-butyltin oxide | 20 | 30 | 50 | 50 | 50 |
| Tri-n-butyltin acetate | 10 | 10 | 10 | 10 | 10 |
| Tri-n-butyltin chloroacetate | 10 | 10 | 10 | 10 | 10 |
| Dirhodanomethane | 20 | 20 | 20 | 20 | 20 |
| Di-d-naphthylmercury sodium methanesulfonate | 3 | 3 | 5 | 1 | 1 |
| 2,4,5-trichlorophenoxy acetic acid | 80 | 100 | 70 | 30 | 20 |
| Mercury phenylacetate | 10 | 5 | 10 | 5 | 2 |

Table 1
Antibiotic Action of Active Agents

| Active Agents | R | (X) | Fungi; Concentration (ppm) | | | | | Testing Period |
|---|---|---|---|---|---|---|---|---|
| | | | A | B | C | D | E | |
| General formula: $(n\text{-}C_4H_9)_3SnOCOCH_2XR$ | | | | | | | | |
| Tri-n-butyltin pentachlorophenoxy acetate | pentachlorophenyl | (O) | 3 | 2 | 2 | 2 | 3 | Over 200 days |
| Tri-n-butyltin 4-nitrophenoxy acetate | 4-nitrophenyl | (O) | 5 | 3 | 2 | 2 | 5 | " |
| Tri-n-butyltin 4-t-buthylphenyl-thio acetate | 4-t-butylphenyl (S) | | 3 | 7 | 7 | 5 | 5 | " |
| Tri-n-butyltin methoxy acetate | $-CH_3$ | (O) | 2 | 5 | 2 | 2 | 2 | " |
| Tri-n-butyltin t-buthoxy acetate | $-(CH_3)_3$ | (O) | 5 | 3 | 3 | 2 | 3 | " |
| Tri-n-butyltin n-propoxy acetate | $-C_3H_7$ | (O) | 4 | 5 | 4 | 3 | 3 | " |
| Tri-n-butyltin ethyl thio acetate | $-C_2H_5$ | (S) | 7 | 7 | 4 | 1 | 4 | " |
| General Formula: $(n\text{-}C_4H_9)_3SnXR$ | | | | | | | | |
| Tri-n-butyltin pentachlorophenol ether | pentachlorophenyl | (O) | 5 | 2 | 1 | 1 | 3 | " |
| Tri-n-butyltin 4-nitrophenol ether | 4-nitrophenyl | (O) | 5 | 3 | 5 | 3 | 3 | " |
| Tri-n-butyltin methyl ether | $-CH_3$ | (O) | 1 | 4 | 5 | 3 | 2 | " |
| Tri-n-butyltin t-buthyl ether | $-C(CH_3)_3$ | (O) | 3 | 5 | 3 | 1 | 3 | " |
| Tri-n-butyltin isopropyl ether | $-C_3H_7$ | (O) | 5 | 5 | 3 | 1 | 3 | " |
| Tri-n-butyltin ethyl thioether | $-C_2H_5$ | (S) | 5 | 3 | 5 | 3 | 4 | " |
| Tri-n-butyltin 4-t-buthylphenyl thioether | 4-t-butylphenyl $-C(CH_3)_3$ | (S) | 5 | 7 | 5 | 3 | 2 | " |

In Table 2 are shown as contrast to the experiment shown in Table 1, records of experiments on known anti-fungi agents. As seen from the table, known anti-fungi agents as indicated, except di-d-naphthyl-mercury-sodium methanesulfonate, have only a much weaker antibiotic action than that of the active constituents according to the present invention. The conditions of the culture tests were the same as in the experiments as shown on Table 1 except that dimethylformamide was used for solvent for the tested compounds. The indications of fungi A, B, C, D, and E are equal to those in Table 1.

In Table 3 are shown records of experiments on aluminium plates coated with paints according to the present invention and paints containing only known anti-fungi agents. In these experiments aluminium plate coated with paints containing acrylic resin as the vehicle in which are contained 0.3 weight percent active agents were put on bacto dextrose agar plate culture media. Mixtures of fungi A, B, C, D and E were sprayed on the culture media and cultured at 37° C. in a thermostat.

Table 3

Experiments on Coated Aluminium Plates

| Active Agents | Testing Period (days) | Observation |
| --- | --- | --- |
| Pentachlorophenol | 10 | With the lapse of days, electrolytic corrosion occur, molds break out. |
| Tri-n-butyltin oxide | 50 | With the lapse of days, effect is lowered, electrolytic corrosion occurs. |
| Tri-n-butyltin acetate | 30 | With the lapse of days, effect is lowered, electrolytic corrosion occurs. |
| Tri-n-butylin chloroacetate | 25 | With the lapse of days, effect is lowered, electrolytic corrosion occurs. |
| Dirhodanomethane | 20 | Rapid lowering of effect. Human skin, particularly, throat is irritated. |
| Di-d-naphthylmercury sodium sulfonate | 100 | Comparatively powerful, but weak to genera Aspergillus and Penicillium. Electrolytic corrosion occurs. |
| Tri-n-butyltin pentachlorophenoxyacetate) + (Tri-n-butyltin pentachlorophenolether) (Example 1) | over 250 | Gives no electrolytic corrosion. At the end of 100 days the effect is no greater than di-d-naphthyl mercurymethane sodium sulfonate, but the effect continues subsequently. |
| Tri-n-butyltin n-propoxy acetate) + (tri-n-butyltin pentachlorophenoxy acetate)(Example 2) | over 250 | Gives no electrolytic corrosion. At th end of 300 days, the effect is inferior to in case of Example 1. |
| (Tri-n-butyltin pentachlorophenoxyacetate) + (Tri-n-butyltin t-buthylether) + (Tri-n-butylin pentachlorophenolether) (Example 3) | over 250 | Gives no electrolytic corrosion. Somewhat more powerful than in the cases of Examples 1 and 2. |
| Tri-n-butyltin pentachlorophenoxy acetate | over 250 | Gives no electrolytic corrosion. |
| Tri-n-butyltin t-buthyloxy acetate | over 250 | Gives no elect rolytic corrosion |
| Tri-n-butyltin methyl ether | over 250 | Gives no electrolytic corrosion |
| Tri-n-butyltin 4-t-buthyl phenyl-thioacetate | over 250 | Gives no electrolytic corrsion |
| Tri-n-butyltin ethyl thioether | over 250 | Gives no electrolytic corrosion |

The organic compounds of tin which are the active agents in paints according to the present invention dissolve slowly in water. However, they dissolve easily in common organic solvents for paints such as xylene, toluene, banzene, aceton, methyl alcohol and the like. And when required they may be dispersed in water with the aid of suitable surface agents or emulsifiers.

As the multiplication of micro-organisms, in general, proceeds in the manner of geometric progressions, they should be checked or made extinct at the beginning of their infiltration, otherwise their multiplication cannot be stopped however great the effort.

In our reserch, the micro-organisms were isolated from the aforementioned jet plane fuel JP-4,as follows:
I. Bacteria
*Pseudomonas aeruginosa, Pseudomonas fluorescens, Bacillus cereus, Aerobacter aerogenes, Flavobacterium arborescens, Clostridium sporogenes, Micrococcus radiodurans, Achromobacter cycloclaster, Spherotilus natans, Desulfovibrio desulfuricans, Comamonas, Vibrio faecalis,* and *Micrococcus caseollyticus.*
II. Fungi
*Cladosporium resinae, Aspergillus niger, Spicarta violaces, Penicillium ochloron, Alterneria tenius* and *Fusarium roseum.*
III. Yeast
*Rhodtorula rubra.*

We have stated in the foregoing that the above-mentioned *Clasdosporium resinae* corrodes aluminium. And it has also been disclosed that Comamonas, *Vibrio faecalis* and *Micrococcus caseolyticus* also corrode the same.

Further, out of fuel storage tanks such as field storage tanks and underground storage tanks of gasoline service stations have been found *Pseudomonas aeruginosa, Pseudomonas fluorescens, Bacillus subtilis, Alcaligenes faecales,* Desulfovibrio and *Aspergillus niger.* Multiplication of such micro-organisms is often accompanied by big accidents when pipes, filters, and nozzles in fuel systems are closed with microbial body compositions and products of corrosion of metal. Also it was reported by Miller et al (R. N. Miller, W. V. Herron, A. G. Krigren, J. L. Cameron, and B. M. Tevvy; Materials Protection, 3, 60—1964), that a micro-organism itself acts in an important role on the corrosion of metal. Heretofore, the corrosion of metal has been considered to be caused by its decomposition by chemical or electrolytic oxidation (E. Beerstrecher Jr., Petroleum Microbiology, Elsevier Press, Houston, Texas—1954, 1st ed. p. 375). However, in view of the above, a new requirement to adding thereto, corrosion by micro organisms would have become apparent.

The corrosion of metal by micro-organisms is characterized by a deep and wide penetration into the metal body and also in clear figure of the peripheral edges of corrosion pits. So it can be distinguished clearly by the above-stated aspects from chemical or electrolytic corrosion. We have confirmed these facts on aluminum alloys. And also, it has become apparent that iron is corroded by micro-organisms more intensively than aluminium alloys.

A paint according to the present invention may form an active film on the face of metal container walls when said walls are coated with said paint. Naturally it may be applied not only to faces of metals, but to faces of synthetic polymer or synthetic resin walls.

The amount of the aforementioned organic tin compound to the amount of whole paint is recommended to be from 0.1 to 0.5 per cent, but may be varied suitably according to condition of use. And when two or more kinds of aforementioned active agent are mixed in a paint, it gives an effect more intense than that having respective single agent.

Some examples of application of paints according to the present invention will be stated as follows:

EXAMPLE 1.

Inner faces of the wall of a tank is previously cleansed sufficiently by removing fat and washing. The cleansed faces are coated with an undercoating paint containing polyvinyl resin as the vehicle and left for from 20 to 30 minutes at room temperatures. On the other hand, a 1:1 mixture of tri-n-butyltin pentachlorophenoxy acetate and tri-n-butyltin pentachlorophenolether is taken at a rate of 1.3 weight percent to a polyamide hardened epoxy resin vehicle, and the resultant mixture is dissolved in a small amount, preferably about 10 volumetric percent of the paint vehicle used, of methyl alcohol.

The following solutions A and B are mixed to obtain the epoxy resin vehicle:

| Solution A 80% | |
|---|---|
| Pigment (Ti O$_2$) | 20% |
| Epoxy resin (Epoxy value: 450–500, commercial name, Epikote No. 1001) | 34% |
| Toluene | 13% |
| Ketone | 8% |
| Ketone Alcohol | 5% |
| Solution B 20% | |
| Polyamide resin | 8% |
| Ethyl alcohol | 4% |
| Ketone | 8% |

This alcoholic solution is then mixed in said epoxy resin vehicle to obtain a paint. Subsequently, the paint is sprayed on the undercoated face stated above. Thereupon, the coated faces are left for 10 minutes and dried and baked at 80° C. for 30 minutes.

EXAMPLE 2

The inner wall faces of a fuel container which has previously been cleansed in the same manner as stated in Example 1 are coated with an undercoating paint mentioned in Example 1 and left for 30 minutes. On the other hand, a 2:1 mixture of tri-n-butyltin n-propoxy acetate and tri-n-butyltin pentachlorophenoxy acetate is taken at a rate of 0.3 weight percent to an acrylic resin vehicle. This mixture is dissolved with a small amount, preferably about 10 volumetric percent of the paint vehicle used, of dimethylformamide. The resultant solution is mixed in the aforementioned vehicle. Then, an active paint is obtained. The paint is sprayed on the undercoated faces stated above. Hereupon, the coated faces are left for 10 minutes, and then dried and baked at 180° C. for 30 minutes.

EXAMPLE 3

The inner wall faces of a fuel container which have previously been cleansed in the same manner as stated in Example 1 are coated with an undercoating paint mentioned in Example 1 and left for 30 minutes. On the other hand, a 1:1 mixture of tri-butyltin pentachlorophenoxy acetate, tri-n-butyltin pentachlorophenolether, and tri-n-butyltin butylether is taken at a rate of 0.3 weight percent to an acrylic resin vehicle. This mixture is dissolved with a small amount, preferably about 10 volumetric percent of the paint vehicle used, of ethyl alcohol. This alcoholic solution of said mixture is then mixed in the aforementioned vehicle. Then an active paint is obtained. This paint is sprayed on the undercoated faces stated above. Hereupon, the coated faces are left for 10 minutes, and then dried and baked at 180° C. for 30 minutes.

The acrylic resin vehicle in the above Examples 2 and 3 is composed of:

| | |
|---|---|
| Pigment (Ti O$_2$) | 25% |
| Heat-hardened type acrylic resin (Copolymer of methylacrylate and buthylacrylate) | 30% |
| Epoxy resin (Epoxy value 450–500, Commercial name, Epikote No. 1001) | 4% |
| Methylated melamine | 2% |
| Polymerization accelerator | 0.5% |
| High aromatic naphtha | 28.5% |
| n-butanol | 10% |
| Ketone | 2% |

We claim:

1. An anti-corrosive paint for oil containers consisting essentially of a tri-n-butyltin compound selected from the group consisting of tri-n-butyltin 4-nitrophenoxy acetate, tri-n-butyltin 4-t-butylphenyl-thio acetate, tri-n-butyltin methoxy acetate, tri-n-butyltin t-butoxy acetate, tri-n-butyltin n-propoxy acetate, tri-n-butyltin ethylthio acetate and tri-n-butyltin 4-t-butylphenyl thioether dissolved, mixed or dispersed in a vehicle comprising synthetic resin and a volatile organic solvent having said resin dissolved therein, said resin being selected from the group consisting of epoxy, and acrylic, resins, the amount of the tin compound being 0.1 to 0.5 part by weight for each 100 parts by weight of whole paint.

2. Method of a preventing corrosion of a container for oil of petroleum origin which consists in coating the inner faces of the container walls with a paint as claimed in claim 1.

3. Method of a preventing corrosion of a container as claimed in claim 2, wherein the coating method includes drying and baking said paint.

* * * * *